United States Patent
Morales et al.

(10) Patent No.: US 7,516,529 B2
(45) Date of Patent: *Apr. 14, 2009

(54) METHOD FOR PRODUCING IN SITU METALLIC FOAM COMPONENTS

(75) Inventors: Arianna T Morales, Royal Oak, MI (US); Paul E Krajewski, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/738,344

(22) Filed: Dec. 17, 2003

(65) Prior Publication Data

US 2005/0136281 A1      Jun. 23, 2005

(51) Int. Cl.
*B23P 17/00*  (2006.01)
*B21D 39/00*  (2006.01)

(52) U.S. Cl. .............. 29/421.1; 29/527.1; 29/897; 72/60; 72/709; 428/613

(58) Field of Classification Search ........... 428/613, 428/654; 164/79; 228/164, 265, 173.1, 173.6; 29/163.6, 897, 897.2
See application file for complete search history.

(56) References Cited

U.S. PATENT DOCUMENTS

| 2,974,034 | A | * | 3/1961 | Bjorksten et al. ............ 75/415 |
| 3,087,807 | A | * | 4/1963 | Allen et al. .................. 75/415 |
| 5,151,246 | A | * | 9/1992 | Baumeister et al. ........... 419/2 |
| 5,564,064 | A | * | 10/1996 | Martin ......................... 419/5 |
| 5,974,847 | A |   | 11/1999 | Saunders et al. |
| 6,085,965 | A | * | 7/2000 | Schwartz et al. ........... 228/190 |
| 6,090,232 | A | * | 7/2000 | Seeliger et al. .............. 156/79 |
| 6,135,542 | A | * | 10/2000 | Emmelmann et al. ....... 296/205 |
| 6,253,588 | B1 |  | 7/2001 | Rashid et al. |
| 6,468,671 | B1 | * | 10/2002 | Streuber ..................... 428/613 |
| 7,100,259 | B2 | * | 9/2006 | Morales et al. ............ 29/421.1 |

FOREIGN PATENT DOCUMENTS

| DE | 4426627 A1 | * | 9/1997 |
| JP | 2000-168021 |  | * 6/2000 |

* cited by examiner

*Primary Examiner*—John J Zimmerman

(57) ABSTRACT

Disclosed is a method for producing a complex composite metal structure having a metallic foam substrate. A sheet metal structure is provided having a metallic foam precursor formed of metallic particles and foaming agents. The sheet metal structure is formed using quick plastic or superplastic formation processes. After or during the formation of the metal, the temperature of the metallic precursor is raised to a point that the foaming agent produces a metallic foam.

6 Claims, 2 Drawing Sheets

METHOD FOR PRODUCING IN SITU METALLIC FOAM COMPONENTS

FIELD OF THE INVENTION

The present invention relates to a method of manufacturing composite foam-sheet metal structures and, more particularly, to a method of manufacturing a foam filled metallic structure using elevated temperature blow forming manufacturing techniques.

BACKGROUND OF THE INVENTION

In a number of products, such as energy absorbing structures required in transportation vehicles, it is frequently necessary for a metal foam portion to be attached to formed sheet metal so that a lightweight structure with appropriate resistance and strength is provided which will deform to absorb energy when subjected to an impact. Such attachment may results very expensive to make if the foam portion and the metallic portion need to be separately shaped and then attached to each other.

A useful method for sheet metal forming is provided in "quick plastic" or "superplastic" forming (QPF and SPF) approaches in which sheet metal is formed into a complex shape in a single-sided forming tool using gas pressure to provide the force to form the sheet metal into a shape. In this regard, metal sheets such as particular types of aluminum alloys, titanium alloys, and any other alloy that show superplastic characteristics are heated to characteristic superplastic temperature and then formed into shapes using gas pressure. The technology allows complex shapes to be formed from materials otherwise difficult to form to the complex shape.

What is needed is an approach for providing (a) a composite structure of sheet metal with a metal foam portion produced in a unified operation in such a manner that the foam does not need to be attached after the foam portion has been produced. The present invention is directed to fulfilling this need.

SUMMARY OF THE INVENTION

The present invention provides a method for producing a complex metal composite structure. The method utilizes SPF or QPF techniques in combination with a metal foam precursor to produce a complex shaped metallic-composite structure. The metal foam precursor contains a mixture of metal powder and a blowing agent.

In another embodiment of the invention, a method for producing a complex composite metal structure having first and second sheet metal layers and a metallic foam disposed therebetween is disclosed. A metal sandwich structure having an intermediate metallic foam precursor layer is provided. The metal sandwich structure is heated to greater than the superplastic formation temperature of the sandwich material. The sandwich structure is then subjected to increasing gas pressure within a die to form a deformed sheet metal sandwich. The deformed sheet metal sandwich is then heated to a temperature greater than the formation temperature so as to foam the metallic foam precursor.

The invention provides a basis for producing complex composite structures, via a single forming operation with commensurate benefits in providing low weight metallic composites. These composites provide excellent energy absorption properties, and good safety (rollover and crush resistance) features and dent resistance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
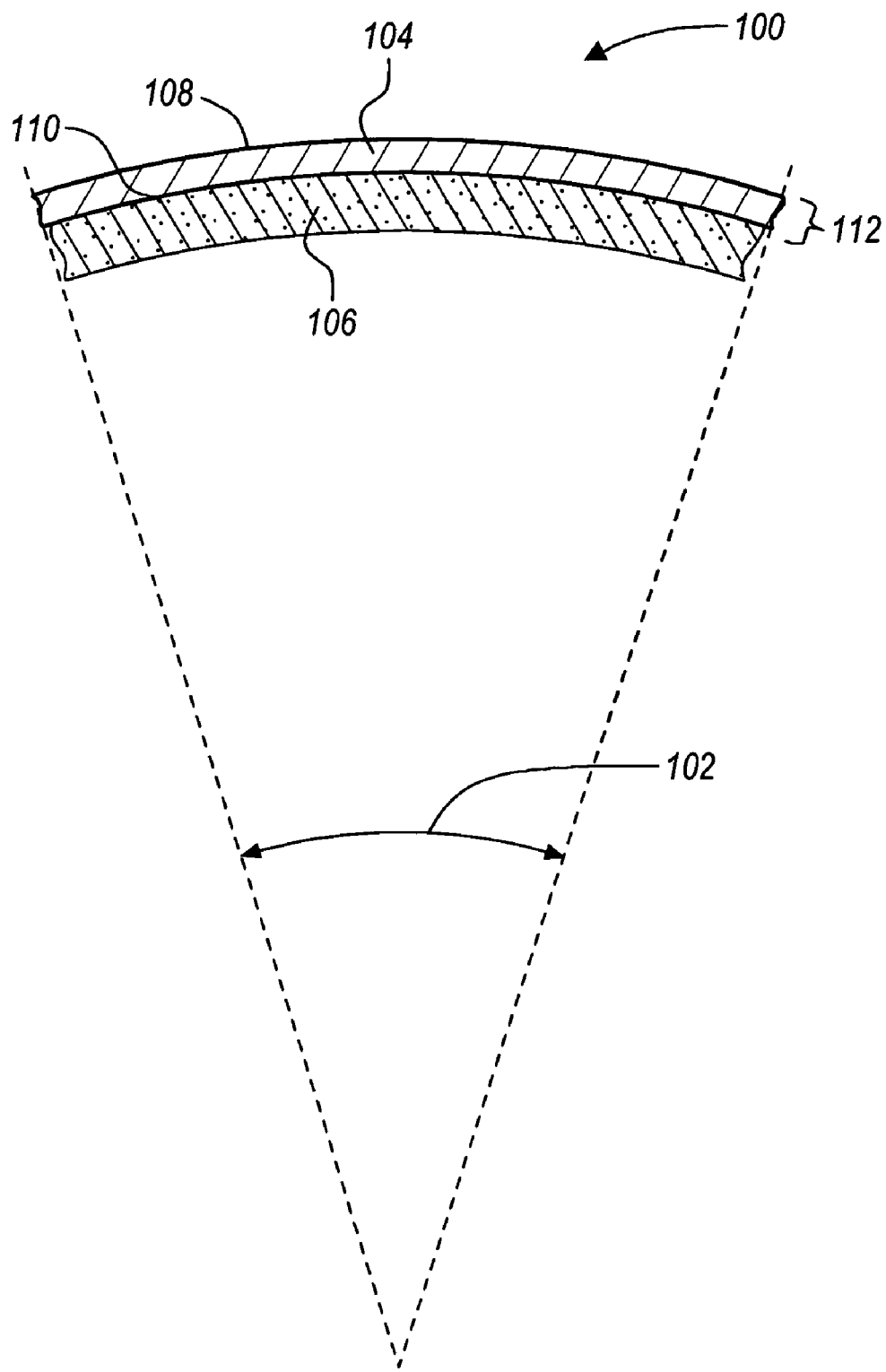
FIG. 1 presents a composite of a formed sheet metal adhered to a metal foam precursor.

The following description of the preferred embodiments is merely exemplary in nature and is in no way intended to limit the invention, its application, or uses.

The preferred embodiments involve combining traditional superplastic (SPF) or quick plastic (QPF) forming technology with liquid cellular metal technology. In this regard, foam precursor mixtures of metal powders and blowing agents are compacted to adhere to a sheet metal and the interim composite is heated to a forming temperature (SPF or QPF as desired). The interim composite is then quick-plastically-formed or super-plastically-formed as the foaming process initiates. The interim composite is then heated to a foaming temperature sufficient to foam the metal foam precursor portion into a desired shape and to fuse the resultant metallic foam to the metal sheet. The heated interim composite is sustained at the foaming temperature for a time sufficient to foam the metal foam precursor portion into the desired shape and to fuse the resultant metallic foam to the metal sheet. The desired shape is achieved after the metallic foam expands to the point where the forming tool cavity restricts the foam growth or, in some embodiments, to the point where a metallic sheet skin layer is formed.

The foam precursor material is formed of a mixture of metal powders (elementary metal powders, alloy powder, or a metal powder blend) and a blowing agent (for example, $TiH_2$) is compacted to yield a densely formed, semi-finished, precursor element. The compaction is performed using techniques such as hot uniaxial compression, isostatic compression, rod extrusion, or powder rolling. The precursor element is then heated to the melting point of the compacted powder.

The blowing agent in the precursor element decomposes and releases a gas; and the gas forces the compacted precursor material to expand into foam, thus forming a highly porous structure for the final foam product. The time needed for full expansion to the final product depends on temperature and the size of the precursor element; depending on the particular materials in the precursor element, this time is usually between a few seconds and several minutes. The degree of expansion and the density of the solid metal foam are controlled by adjusting blowing agent composition and foaming parameters such as temperature and heating rate.

The foam precursor mixtures of metal powders and blowing agents are compacted to adhere to a sheet metal (or, in some embodiments, compacted between two sheets) by alternative approaches which include mechanical compaction, bonding with an adhesive, or spraying of the foam precursor mixture onto the metal sheet. After the interim composite is placed into a forming machine, the temperature is increased to an appropriate temperature for quick plastic (QPF) forming. By way of non-limiting example, aluminum is heated to about 450° C. for QPF forming. Example applications of QPF foam-filled structures include, without limitation, pillar reinforcements, and interior surfaces for closures, roofs and other side impact protection components.

The interim composite is then heated to a foaming temperature sufficient to foam the metal foam precursor. The heated interim composite is sustained at the foaming temperature for a time sufficient to foam the metal foam precursor portion into the desired shape and to shape the metallic layers by the introduction of forming air or a forming non-reactive gas in the die cavity. The desired shape is achieved after the metallic foam expands to the point where the forming tool cavity restricts the foam growth.

Turning now to FIG. 1, a composite 100 of a formed sheet metal 104 adhered to a metal foam precursor 106 is presented. Formed sheet metal 104 is a metal portion in composite 100 having upper surface 108 and lower surface 110. In a preferred embodiment, sheet 104 is aluminum with a thickness 112 of greater than about 0.25 mm. Although the sheet metal 104 has an arc length surface curvature subtended by angularity of at least 30 degrees as shown in angle 102, the method is equally applicable to flat sheets. Metal foam precursor portion 106 adheres to surface 110 of sheet metal portion 104. As discussed, the foam precursor portion 106 is made of a mixture of metal powder and a blowing agent (for example and without limitation, $TiH_2$). Composite 100 is a formed composite precursor interim product made by (a) adhering metal foam precursor portion 106 to surface 110 of sheet metal 104, (b) heating the precursor structure to a temperature sufficient for superplastic forming, and (c) forming the precursor structure to the curvilinear shape. As should be apparent, when a blend of metal powders is used in foam precursor portion 106, the metallic component of the resulting foam will contain a plurality of solid metallic microphases.

Figure 2:
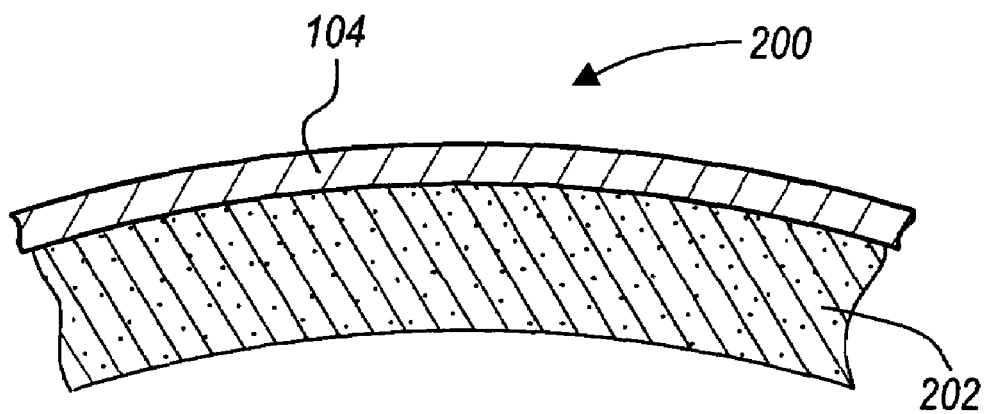
FIG. 2 shows a composite of a formed sheet metal fused to a metal foam.

Turning now to FIG. 2, composite 200 of formed sheet metal 104 is shown fused to metal foam portion 202. Metal foam portion 202 was derived from (a) heating composite 100 (the formed precursor structure) to a foaming temperature sufficient to foam metal foam precursor portion 106 into the shape of composite 200 and to fuse resultant metallic foam 202 to sheet metal 104 and (b) sustaining the temperature of formed precursor structure 100 at the foaming temperature for a time sufficient to foam metal foam precursor portion 106 into the shape of composite 200 and to fuse resultant metallic foam 202 to sheet metal 104.

Figure 3:
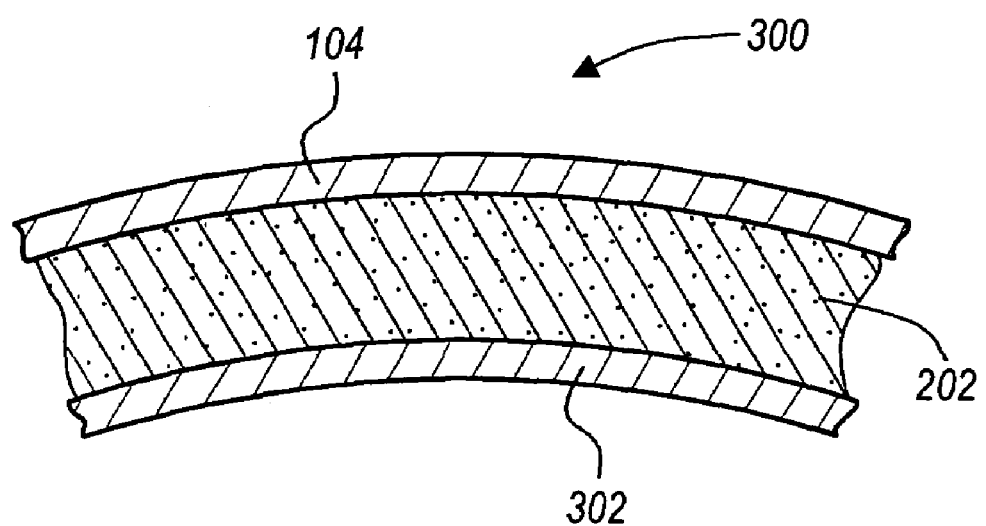
FIG. 3 shows a sandwich composite of two formed metal sheets fused to a metal foam core.

FIG. 3 introduces a method used for making energy absorbing structures for use in vehicles. In this method, a first aluminum alloy with superplastic characteristics (per example, AL 5083) sheet metal having a perimeter profile, an upper surface and a lower surface, is provided as a base (the perimeter profile is the outline of the first sheet metal when viewed from an orthogonal reference to the plane of the sheet). A mixture of aluminum powder and a blowing agent is then adhered (sprayed, isostatically pressed, or compacted on the aluminum alloy sheet) as a foam precursor to a surface of the first aluminum sheet to form a first energy absorbing structure precursor structure. A second aluminum sheet metal (having essentially the same perimeter profile and thickness dimensions as the first aluminum metal sheet) is then adhered to the metal foam precursor portion to form a second energy absorbing precursor structure (a sandwich composite precursor).

The second energy absorbing precursor structure is (a) heated to an adequated temperature for blow forming and foaming and (b) formed through gas pressure shaping to a desired shape for an energy absorbing structure formed. The temperature is sustained at the foaming temperature for a time sufficient to foam the metal foam precursor portion into the energy absorbing structure so that crash padding for use in vehicles is provided. Other exemplary applications of QPF foam-filled structures in vehicles include, but are not limited to, pillar reinforcements and inners for closures, roofs, and side-impact-protection components.

As described herein, super-plastic and quick-plastic fabrication of sandwiched metallic sheet and foam composites provides a unified operation for making composite structures sheet metal with sandwiched metal foam where the foam portion is fused into the metal sheet. The economic forming operation enables manufacture of low weight metal-sheet/metal-foam composites having good impact absorption properties.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method for making a composite structure, the method consisting of:
   providing a forming tool defining a curved cavity;
   providing a flat first sheet metal layer comprising a superplastically formable material;
   adhering a metal foam precursor layer to said flat first sheet metal layer to form a precursor structure, said precursor layer comprising a mixture of metal powder and a blowing agent;
   disposing said precursor structure within said forming tool curved cavity;
   heating said precursor structure to a temperature sufficient for superplastic forming within said forming tool curved cavity;
   applying hydrostatic pressure to one side of said superplastically deformable material within said forming tool cavity;
   superplastically forming said precursor structure after adhering said metal foam precursor layer within said forming tool curved cavity; and
   heating said formed precursor structure to a foaming temperature sufficient to foam said metal foam precursor portion and to fuse the resultant metallic foam to said first sheet metal layer within said forming tool curved cavity; wherein the resultant metallic foam is fused to said first sheet metal layer after said superplastic forming of said first sheet metal layer into a curvilinear shape which mates with a curved shape defined by the forming tool curved cavity.

2. The method of claim 1, wherein said metal powder comprises a metal powder alloy.

3. The method of claim 1, wherein said flat first sheet metal comprises a superplastically formable material.

4. The method of claim 2, wherein said flat first sheet metal portion comprises aluminum.

5. The method according to claim 2 further comprising coupling a second flat sheet metal layer to the foam precursor.

6. A method for making energy absorbing padding for use in vehicles, the method consisting of:
   providing a forming tool defining a curved cavity;
   providing a flat first aluminum sheet metal having a perimeter profile, an upper surface, and a lower surface;

adhering a metal foam precursor portion to a surface of said flat first aluminum metal sheet to form a first energy absorbing precursor structure, said foam precursor portion comprising a mixture of aluminum powder and a blowing agent of $TiH_2$;

adhering a flat second aluminum sheet metal to said metal foam precursor portion to form a second energy absorbing precursor structure;

disposing said precursor structure within said forming tool curved cavity;

heating said second precursor structure to between about 450 degrees C and about 600 degrees C within said forming tool curved cavity;

applying gas pressure to said second energy absorbing precursor structure so as to superplastically form said energy absorbing precursor structure to a desired curvilinear shape within said forming tool curved cavity;

heating said precursor structure to a foaming temperature sufficient to foam said metal foam precursor within said forming tool curved cavity; and sustaining the temperature of said precursor structure at foaming temperature for a time sufficient to foam said metal foam precursor portion into a desired shape and to fuse the resultant metallic foam to both said first and said second aluminum metal sheets within said forming tool curved cavity;

wherein said step of applying gas pressure to said second energy absorbing precursor is after said step of adhering a metal foam precursor portion.

* * * * *